P. ARDUIN.
MACHINE FOR MAKING PASTRY CONES.
APPLICATION FILED NOV. 26, 1919.
1,337,500.
Patented Apr. 20, 1920.
3 SHEETS—SHEET 1.
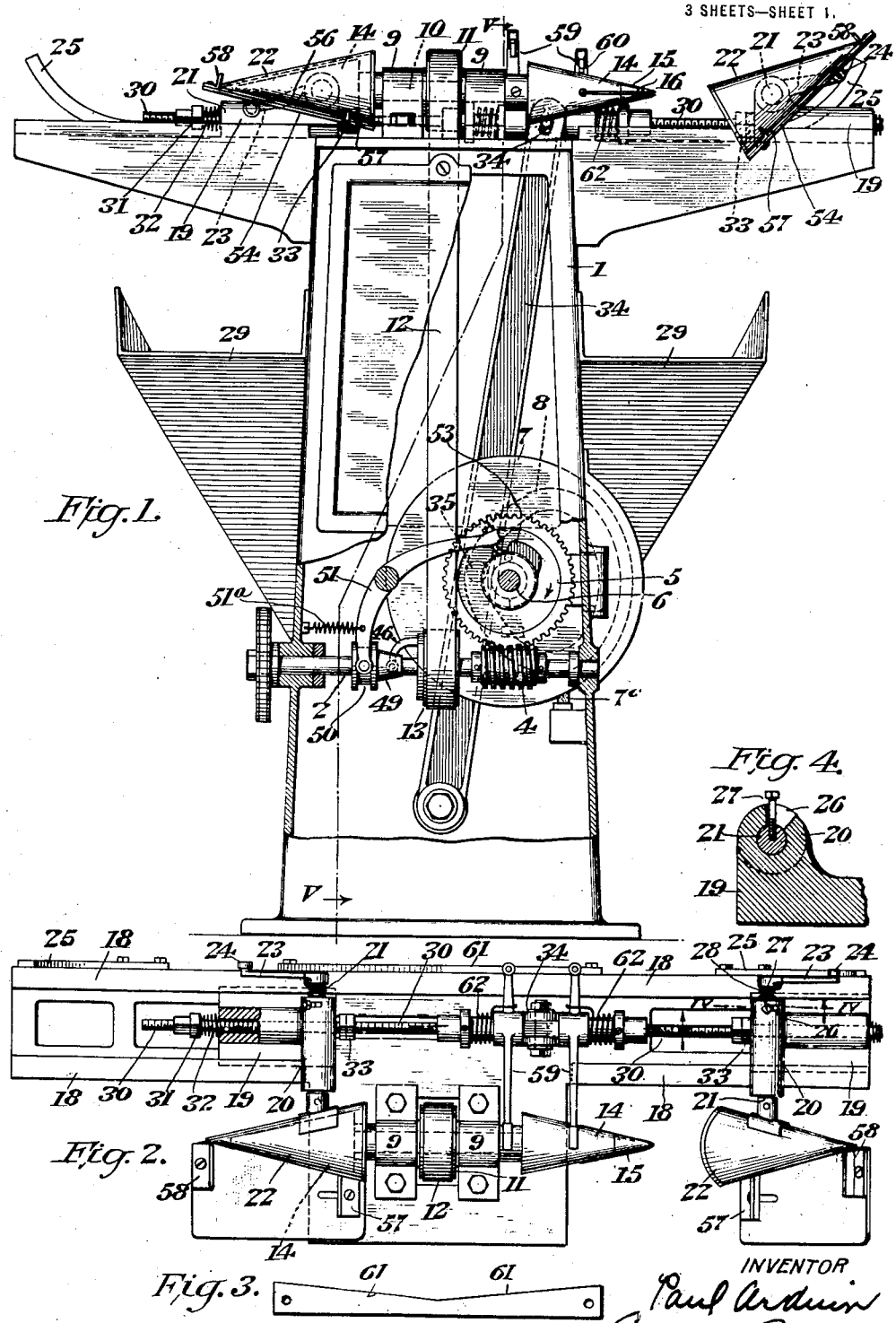
INVENTOR
Paul Arduin
BY
ATTORNEYS P. ARDUIN.
MACHINE FOR MAKING PASTRY CONES.
APPLICATION FILED NOV. 26, 1919.
1,337,500.
Patented Apr. 20, 1920.
3 SHEETS—SHEET 2.
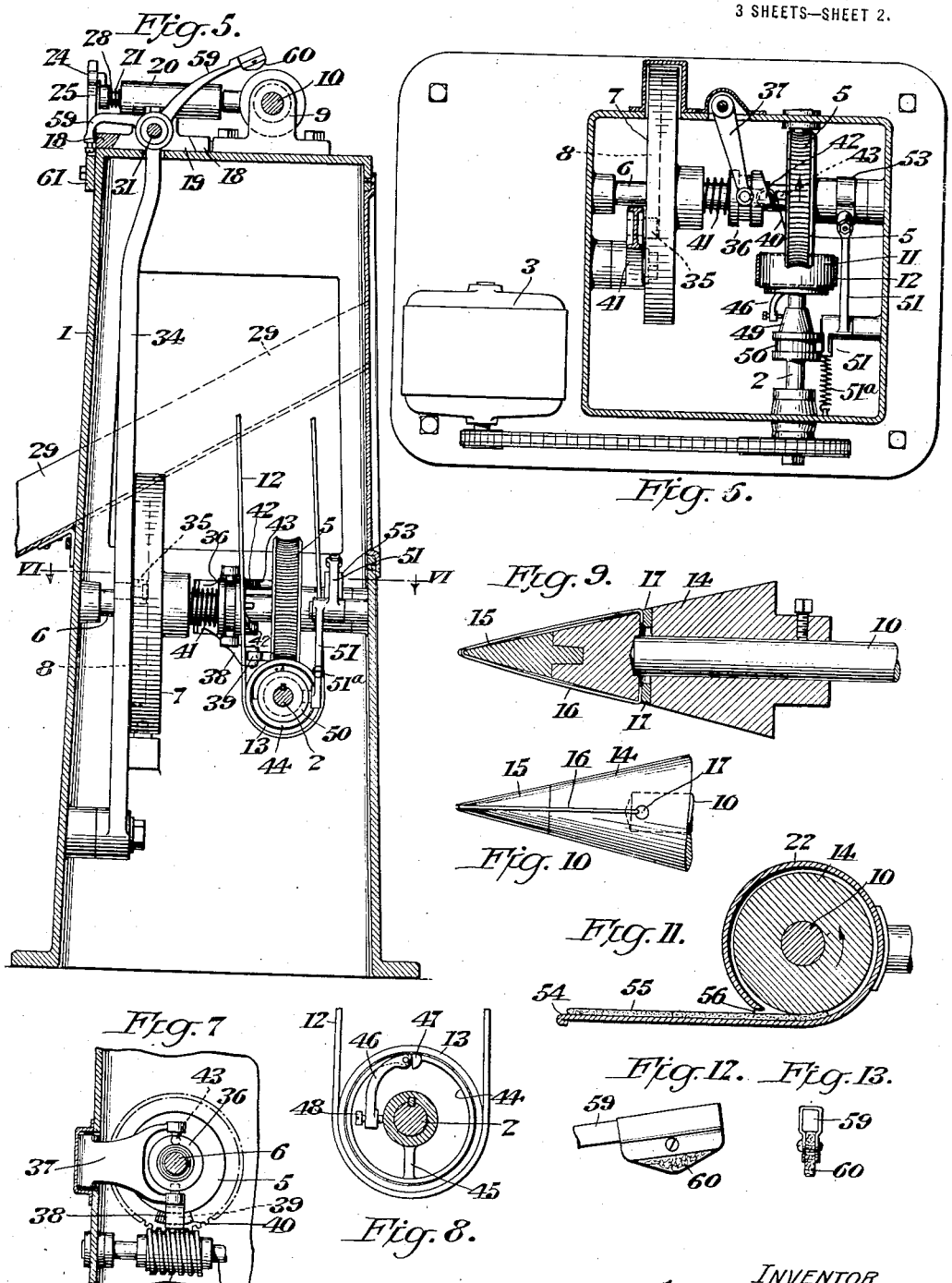

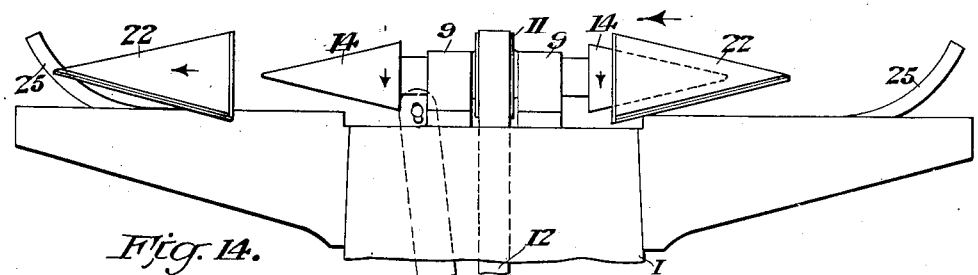
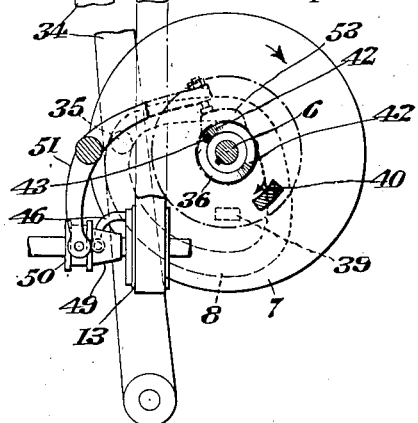
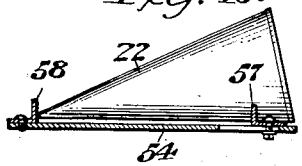
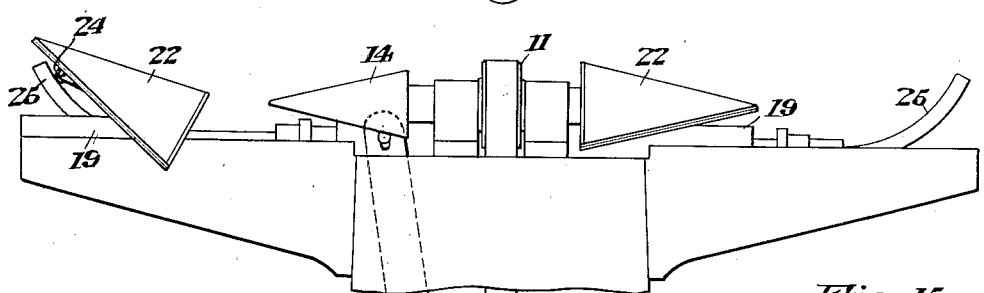
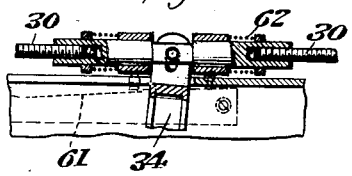
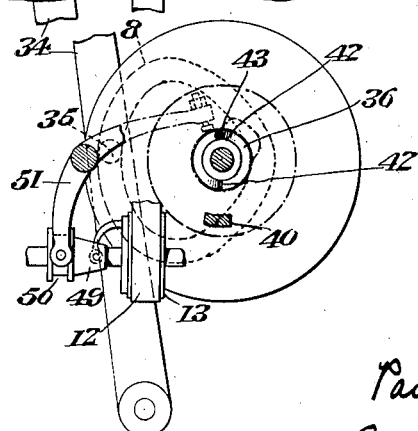

UNITED STATES PATENT OFFICE.

PAUL ARDUIN, OF MOUNT VERNON, NEW YORK, ASSIGNOR TO ARDUIN BROTHERS, OF MOUNT VERNON, NEW YORK, A COPARTNERSHIP COMPOSED OF ROBERT ARDUIN AND CAESAR ARDUIN.

MACHINE FOR MAKING PASTRY CONES.

1,337,500.                     Specification of Letters Patent.       Patented Apr. 20, 1920.

Application filed November 26, 1919. Serial No. 340,912.

*To all whom it may concern:*

Be it known that I, PAUL ARDUIN, a citizen of the United States, and resident of Mount Vernon, in the county of Westchester and State of New York, have invented certain new and useful Improvements in Machines for Making Pastry Cones, of which the following is a specification.

This invention relates to improvements in machines for forming hollow, cone-shaped containers, and is especially adapted for use in forming previously cooked edible wafers into cone-shaped containers for ice cream.

The invention has for one object the provision of simple mechanism for rapidly shaping an edible wafer into permanent cone form.

Another object of the invention is to provide a machine having reciprocating means for presenting hollow cone-forming dies to cone-shape mandrels and then rotating the mandrels to shape the wafer thereon to form the complete pastry cone.

In the operation of the machine the movements of the wafer shaping dies and the mandrels are so timed that there will be a dwell or rest in the reciprocating movement of the dies of sufficient time to permit a wafer to be properly placed on the receiving table or shelf of the die. At the time of this dwell or rest one die is in engagement with its coöperating mandrel and the other is removed therefrom, so that at all times there is one die in position to receive a wafer. Means are provided whereby the mandrels will be intermittently rotated to wrap the pastry wafer around the mandrel and within the forming die when the forming die has been brought into coöperative relation with the mandrel.

In the drawings:

Figure 1 is a front elevation of the machine, parts being broken away and shown in sectional view to more clearly illustrate the construction thereof;

Fig. 2 a plan view of the machine, a small part being broken away and shown in sectional view;

Fig. 3 a rear view of the cam for operating the pastry cone detaching means;

Fig. 4 a vertical sectional view of the die supporting shaft and slide taken on the line IV—IV of Fig. 2;

Fig. 5 a vertical sectional view of the machine on the line V—V of Fig. 1;

Fig. 6 a horizontal sectional view on the line VI—VI of Fig. 5;

Fig. 7 a detail vertical sectional view showing a portion of the driving means;

Fig. 8 a detail view of the clutch mechanism adapted to control the rotation of the cone forming mandrels;

Fig. 9 a longitudinal sectional view of one of the mandrels;

Fig. 10 a detail elevation of a portion of one of the mandrels;

Fig. 11 a transverse sectional view of one of the cone forming dies showing a mandrel therein;

Figs. 12 and 13 detail views of one of the cone detaching fingers;

Figs. 14 and 15 diagrammatic views showing the forming dies in different positions;

Fig. 16 a sectional view of one of the forming dies; and

Fig. 17 a detail view of the connection between the die moving bar and its operating lever.

Referring to the various parts by numerals, 1 designates the frame of the machine, said frame constituting a base or support upon which all of the operating mechanism is mounted. On the base of the machine is suitably mounted a motor 3 which is connected through a suitable belt or driving chain to a driving sprocket on the main drive shaft 2. The shaft 2 is mounted in suitable bearings in the base of the machine and carries a driving worm 4 rigidly connected thereto. Mounted in the base above the drive shaft and at right angles thereto is an intermediate shaft 6 on which is loosely mounted a worm gear 5, said gear meshing with the worm 4 as clearly shown in Fig. 1 so that said worm gear 5 is constantly rotated through the worm on the drive shaft. Rigidly mounted on the intermediate shaft 6 is a die reciprocating cam disk 7, said disk being provided with a cam groove 8 formed in one face thereof.

On the top of the machine in suitable bearings 9 is mounted a mandrel shaft 10 said shaft being parallel with the main drive shaft. Between the bearings 9 said shaft is provided with a belt pulley 11 which is connected by a belt 12 with a driving pulley 13 on the main drive shaft. The pulley 13 is loose on said shaft and is connected thereto, by means of a clutch which is suitably timed in its operation as will be hereinafter described. The mandrel shaft extends at each end beyond its bearings, and on each end thereof is rigidly secured a cone-shaped mandrel 14. Each mandrel is provided at its outer pointed end with a hard steel section 15 which is rigidly and permanently connected to the body of the mandrel. Each mandrel is also provided at its pointed end with a spring wire loop 16 which extends around the point of the mandrel to form the cone detaching means described in my copending application for patent, Serial No. 305,557, filed June 20, 1919. The ends of this detaching wire are secured in perforations in the mandrel body by means of soft plugs 17. When it is desired to detach the wires from the mandrels, the mandrel is first removed from the mandrel shaft and the plugs 17 then driven inwardly until they fall into the aperture in which the mandrel shaft fits.

Mounted in suitable horizontal guide ways 18 supported at the top of the machine parallel with the mandrel shaft, and in the rear thereof, are two die-carrying slides 19. On the inner end of each of these slides is formed a transversely extending bearing 20, and in each bearing is mounted a horizontal rock shaft 21. On the forward end of each of said shafts is mounted a hollow cone-shape forming die 22. The forming dies are so mounted on said shafts that when they are in a horizontal position, as indicated at the left-hand side in Fig. 1, they are axially in line with the mandrel shaft and the mandrels and may be moved inwardly over the mandrels, also as indicated at the left-hand side of Fig. 1. On the rear end of each of the shafts 21 is mounted an arm 23, carrying at its free end a roller 24, which is adapted to engage an upwardly curved track 25, for a purpose which will be fully hereinafter described. The bearings 20 are each provided with a transverse slot 26 in which a pin 27 is adapted to work, said pin being rigidly secured to the shaft 21 and serving to limit the rocking movement of the shaft. Coiled about the rear end of each of the shafts 21 is a spring 28, one end of which engages the rigid bearing, the other end engaging the crank arm 23 and normally tending to throw said arm downwardly and to hold the forming die in horizontal position, the pin 27 serving as means to limit the movement of the rocking shaft under the influence of the spring 28. As the die-carrying slide moves to its extreme outer position, as will be hereinafter described, the roller 24 of the crank arm 23 engages a curved track 25 and tilts the forming die, as shown at the right in Fig. 1 in order to discharge the formed cone into the delivery chute 29.

The die-carrying slides are connected together by a bar 30 which extends loosely through the slides and is provided on its outer ends with adjustable collars 31. Between these collars and the outer ends of the slides are interposed coil springs 32. On the bar 30 near the inner ends of the slides are mounted adjustable stops 33 which are adapted to bear against the slides. The purpose of the springs 32 is to provide a yielding connection between the bar 30 and the slides to thereby insure a yielding pressure between the forming die and the mandrel during the operation of winding the pastry wafer on the mandrel. The stops 33 positively engage the inner ends of the slides when the bar 30 is reciprocated in the proper direction to force the engaged forming die away from its coöperating mandrel. A die-reciprocating lever 34 is pivoted near the lower end of the base of the machine, its upper end being connected to the bar 30 substantially midway between the die-carrying slides 19. This lever carries a roller 35 which works in the cam groove 8 so that as the cam disk 7 is rotated the lever 34 is swung back and forth and carries with it the slides 19 and the dies 22. The bar 30 is preferably made in two sections rigidly connected together, and the lever 34 is connected to said bar 30 at the point where the two sections of said bar are joined. Any suitable means may be employed for connecting together the two sections of the bar 30, and the lever 34 may be connected to said bar in any suitable manner.

The forming dies are intermittently reciprocated and are caused to rest or dwell at each end of their movement in order to permit a pastry wafer to be properly placed in the die which is disengaged from its coöperating mandrel. To cause this rest or dwell the die reciprocating cam is connected and disconnected from its operating worm gear by means of an automatically operating clutch. This clutch consists of a clutch sleeve 36 slidably mounted on the shaft 6 and keyed to rotate therewith. This sleeve is connected by means of the usual annular groove and fork to a horizontal lever 37 pivoted at any suitable point in the machine frame. This lever carries a laterally extending finger 38 which is provided at its outer end with a roller 39 which is adapted to engage a bevel lug 40 formed on the side of the worm gear 5. A coiled spring 41 presses the clutch sleeve 36 and roller 39 toward the worm gear. On the face of the clutch sleeve adjacent the worm gear are formed, at diametrically opposite points, two clutch teeth 42. On the worm gear 5 is secured a laterally extending clutch pin 43 which is adapted to engage the clutch teeth 42. The pin 43 is diametrically opposite the lug 40. The operation of this clutch mechanism is as follows: When the pin 43 is in engagement with one of the teeth 42 of the clutch sleeve the shaft 6 and the disk 7 will rotate with worm gear 5 until the bevel lug 40 engages the roller 39 and forces the clutch sleeve laterally against the spring 41, thereby disconnecting the engaged tooth 42 from the pin 43. The cam disk 7 and the shaft 6 will then remain stationary until the worm gear has rotated sufficiently to bring the pin 43 into engagement with the next tooth 42 on the clutch sleeve. When the pin has engaged this other tooth on the clutch sleeve the shaft 6 and the disk 7 will be again rotated until the clutch is again disengaged by means of the bevel lug 40 engaging the roller 39. It is obvious, therefore, that the cam disk will remain stationary during one half of each revolution of the gear 5. The timing of this disconnection between the gear 5 and the cam disk 7 is so related to the cam groove 8 that it will take place at the moment, or substantially so, when the cam groove, through its connection with the lever 34, will have moved the die-carrying slides to the limits of their lateral movements. As shown in Fig. 1 the clutch is released with the die-carrying slides at the limit of their movement toward the right; while in Fig. 15 the clutch is released with the die-carrying slides at the limit of their movement toward the left. As shown in Fig. 14 the clutch is not released but the releasing lug 40 is approaching the roller 39. The parts are so proportioned and timed that the releasing lug 40 reaches the clutch release roller 39 when the die-carrying slides reach the limit of their reciprocating movement, and this is so without regard to the direction of movement of the slides. In order to provide a further dwell or rest for the die-carrying slides the cam groove 8 is provided with concentric portions at the extreme limits of its throw so that when the cam is connected to the gear 5 there will be a slight rotation of the cam before it picks up lever 34 and starts the movement of the die-carrying slides. These concentric portions of the cam groove may be of the proper length to provide the desired additional dwell in the movement of the cone-forming dies. It is desirable that the mandrels be given a few rotations just before the engaged shaping die is moved away to release the pastry cone, and to this end the cam 53 is so located that it will operate the mandrel driving clutch an instant before the lever 34 starts its movement to move the cone-forming dies. This brief rotation of the mandrel serves to free the completed pastry cone so that it will move outwardly with the shaping die. By providing the concentric portions of the cam groove 8 the timing of this operation may be nicely secured.

The driving pulley 13 is loose on the drive shaft 2, as hereinafter pointed out, but is adapted to be connected to rotate with said shaft by an expanding clutch ring 44. This ring is rigidly connected to a collar on the shaft by a radial post 45 substantially midway between its free ends; and it lies within and close to the rim of drive pulley 13. Pivoted to one end of the clutch ring is cam lever 46, the cam of which is adapted to engage the other end of the clutch ring at 47 in order to expand it into engagement with the pulley rim. The free end of lever 46 is provided with screw 48 which is adapted to be engaged by the cone 49 carried by a clutch sleeve 50 slidably mounted on the drive shaft. The cone 49 is adapted to move lever 46 outwardly and thereby clutch the driving pulley to the driving shaft. The clutch sleeve 50 is engaged by the lower end of a clutch lever 51 suitably pivoted in the frame of the machine. The upper end of this lever is provided with a contact screw which is adapted to be engaged by a cam 53 formed on the hub of the worm gear 5. This cam is so located and timed in its operation that it will operate the driving pulley clutch as the forming dies are moved over the mandrel, and will disconnect the driving pulley from the driving shaft when the dies have reached their final position and the pastry cone has been formed about the mandrel and pressed by the movement of the forming dies to their final position. It is desirable that the mandrels be given a few turns after the forming dies have reached their final position, the purpose being to make the pastry cones smooth and to be sure that the overlapped portions of the wafer have been thoroughly united and merged into a complete homogeneous structure. It is to be noted that the cam 53 is carried by the worm gear 5 and will operate to connect and disconnect the driving pulley to the drive shaft once during each rotation of the worm gear.

The cone-forming dies are preferably of sheet metal and provided with a flat table or shelf 54 on which the wafer 55 is to be placed, as indicated in Fig. 11. The dies are provided with a longitudinally extending mouth 56 through which the wafer is adapted to slide into engagement with the mandrel within the die. This construction is substantially the same as the forming dies shown in my hereinbefore mentioned application. The wafers are placed on the table when the forming die is in the tilted position shown at the right-hand side of Fig. 1. To enable the wafer to be accurately placed thereon an adjustable guide flange 57 is secured to the table near the larger end of the die. This flange enables the operator to accurately place the wafer and also serves as means for holding the wafer on the inclined shelf. A rigid guide 58 is secured at the outer end of the shelf 54 to accurately gage the wafer with respect to the smaller end of the die. By means of the adjustable guide 57 wafers of different sizes may be accurately guided through the mouth 56.

It sometimes happens that the pastry cones will not detach themselves from the mandrels. I, therefore, provide automatically operating means to detach any cones which by accident remain attached to the mandrels. Rock arms 59 are mounted on the bar 30 adjacent the upper end of the lever 34. These rock arms at their forward ends are provided with soft contact shoes 60, formed of leather or other suitable material, said contact shoes being adapted to be brought down on the mandrels during the reciprocation of the dies, so that should there be a pastry cone adhering thereto it will be detached and caused to drop therefrom. The rock arms extend rearwardly and downwardly, and are adapted to engage the inclined surfaces of the cam 61 near each end of the reciprocating movement of the dies. One of the shoes 60 is adapted to operate on one of the mandrels, the other being adapted to operate on the opposite mandrel. Coiled about the bar 30 are springs 62, said springs being connected to the rearwardly extending portions of the rock arms and normally forcing them downwardly to thereby lift the shoes 60 above the mandrels and also above the pulley 11. The rock arms are preferably adjustable on the bar 30 in order to adapt them to engage the mandrels properly and to adjust them for proper operation on pastry cones of different sizes.

It is thought that the operation of the machine will be fully understood from the foregoing description. The complete pastry cones are removed from the mandrels by the dies and when said dies are tilted by the upwardly curved tracks 25, they are deposited in the chute 29. At each movement of the die-carrying slides a pastry cone is deposited in the chute 29. As hereinbefore pointed out, springs 32 yield slightly at the ends of the movements of the lever 34 to secure a yielding pressure in the cone forming die and the mandrel, the collars 31 being adjustable to vary the spring tension.

The clutch sleeve 50 is returned to its normal position by a spring 51ᵃ. The cam disk 7 engages a friction block 7ᵃ so that it will stop when it is disconnected from the worm gear 5.

What I claim is:

1. In a machine for forming pastry cones from wafers, the combination of a stationary support, a shaft rotatably mounted on said support, a conical mandrel fixed on said shaft, a hollow conical die having a longitudinally extending wafer-feed throat, a die carrier, means for moving the die carrier to shift the die endwise toward and from mandrel-embracing position, and means for rotating the shaft.

2. In a machine for making conical containers, a rigid support, a mandrel shaft, a conical mandrel on the end of said shaft, a hollow conical die, a movable die carrier supporting said die, means for moving the die carrier and the die to and from the mandrel, means for rotating the mandrel, and means for tilting the die as it is moved away from the mandrel to discharge the formed container.

3. In a machine for forming pastry cones, the combination of a stationary support, a shaft rotatably mounted on said support, a conical mandrel fixed on said shaft, a hollow conical die having a longitudinally extending blank-feed throat, a die carrier slidably mounted on said support, means for reciprocating the die carrier to shift the die endwise toward and from the mandrel, a yieldable connection between the die carrier and the means for reciprocating the carrier, and means for rotating the shaft.

4. In a machine for forming conical containers from pastry blanks, the combination of a stationary support, a conical mandrel mounted on said support, a hollow conical die having a blank-feed throat at one side thereof, a die carrier slidably mounted on the support, means for reciprocating the die carrier to shift the die endwise toward and from the mandrel, and intermittently operating means for rotating the mandrel about its axis when the die is moved into coöperative relation with the mandrel.

5. In a machine for forming conical containers from pastry blanks, the combination of a stationary support, a conical mandrel journaled on said support, a hollow conical die having a blank-feed opening in one side thereof, means for moving the die endwise into and out of mandrel-embracing position and for holding the die temporarily at rest at the opposite limits of its movement, and means for rotating the mandrel about its axis.

6. In a machine for forming conical containers from pastry blanks, the combination of a stationary support, a conical mandrel journaled on said support, a hollow conical die having a blank-feed opening in one side thereof, means for moving the die endwise into and out of mandrel-embracing position and for holding the die temporarily at rest at the opposite limits of its movement, and intermittently operating means for automatically rotating the mandrel about its axis during movement of the die to mandrel-embracing position and during the period the die is held at rest in said position.

7. In a machine for forming conical containers from pastry blanks, the combination of a stationary support, a horizontally disposed conical mandrel journaled on said support, a hollow conical die having a blank-feed opening in one side thereof, means for moving the die longitudinally into and out of mandrel-embracing position and for holding the die temporarily at rest at the opposite limits of its movements, means for automatically tilting the die to turn the larger end thereof downwardly after the die is withdrawn from the mandrel to discharge a formed container, and means for rotating the mandrel about its axis.

8. In a machine for making conical containers, a rigid support, a mandrel shaft mounted thereon, a conical mandrel on each end of said shaft, a pair of die carriers, a hollow conical die mounted on each of said die carriers adapted to coöperate with one of said mandrels, means for reciprocating the die carriers to bring the dies alternately into coöperative relation to the mandrels, and means for rotating the mandrels as each die is brought into coöperative relation with its mandrel.

9. In a machine for making conical containers, a rigid support, a mandrel shaft mounted thereon, a conical mandrel on each end of said shaft, a pair of die carriers, a hollow conical die mounted on each of said die carriers, means for reciprocating said die carriers to bring the dies into coöperative relation with the mandrels, said reciprocating means causing the dies to rest or dwell at each end of its reciprocating motion, and means for rotating the mandrels.

10. In a machine for making conical containers, a rigid support, a mandrel shaft mounted thereon, a conical mandrel on each end of said shaft, a pair of die carriers, a hollow conical die mounted on each of said die carriers adapted to coöperate with one of said mandrels, means for reciprocating the die carriers to bring the dies alternately into coöperative relation to the mandrels, means for rotating the mandrels as each die is brought into coöperative relation with its mandrel, and a yielding means between the dies and the die moving means and adapted to yield when the dies are forced over the mandrels.

11. A machine for making conical containers comprising a mandrel shaft, a conical mandrel on each end of said shaft, a reciprocating die carrier, a pair of hollow conical dies on the said carrier, and means for reciprocating said dies to bring one die into coöperative relation with one of the mandrels and to take the other die away from the other mandrel, said reciprocating means causing the die carrier to rest or dwell at each end of its reciprocating motion.

12. A machine for making conical containers comprising a mandrel shaft, a conical mandrel on each end of said shaft, a reciprocating die carrier, a pair of hollow conical dies on the said carrier, means for reciprocating said dies to bring one die into coöperative relation with one of the mandrels and to take the other away from the other mandrel, said reciprocating means causing the die carrier to rest or dwell at each end of its reciprocating motion, and means for tilting each die as it is moved away from its coöperating mandrel.

13. In a machine for forming conical containers from pastry blanks, the combination of a stationary support, a mandrel shaft rotatably mounted on said support, a conical mandrel fixed on one end of said shaft, a hollow conical die, a die carrier slidably mounted on the support, means for reciprocating the die carrier to shift the die endwise toward and from the mandrel, means for rotating the shaft, and a spring-pressed ejector pivotally mounted on the die-carrier-reciprocating means adapted to wipe along the surface of the conical mandrel longitudinally of the mandrel when the die is withdrawn from the mandrel.

14. In a machine for making pastry cones, the combination of a stationary support, a mandrel shaft rotatably mounted thereon, a conical mandrel fixed on one end of said shaft, a hollow conical die, a die carrier, means for moving the die carrier to shift the die toward and from the mandrel, means for rotating the mandrel, an ejector movable with the die carrier longitudinally of the mandrel, and means for causing said ejector to wipe along the surface of the conical mandrel.

15. In a machine for forming pastry cones, the combination of a conical mandrel, a hollow conical die, means for rotating the mandrel about its axis, means for moving the die into and out of mandrel-embracing position, a mandrel wiping device movable with the die longitudinally of the mandrel, and means for yieldably forcing the wiping device against the surface of the conical mandrel.

16. In a machine for making conical containers, a rigid support, a mandrel shaft mounted thereon, a conical mandrel on each end of said shaft, a pair of die carriers, a hollow conical die mounted on each of said die carriers adapted to coöperate with one of said mandrels, means for reciprocating the die carriers to bring the dies alternately into coöperative relation to the mandrels, means for rotating the mandrels as each die is brought into coöperative relation with its mandrel, and a pair of mandrel wiping devices movable with the die carriers, each adapted to engage one of the mandrels when the coöperating die is removed therefrom.

17. A machine for making conical containers comprising a rigid support, a mandrel shaft mounted thereon, a conical mandrel on each end of said shaft and axially in line therewith, a die carrier, a conical die on each end thereof adapted to coöperate with the conical mandrels, a die reciprocating cam, a lever adapted to be moved by said cam and connected to the die carrier, a drive shaft, a clutch mechanism interposed between the drive shaft and the die moving cam, and means operated from the drive shaft to automatically operate said clutch mechanism.

18. A machine for making conical containers comprising a rigid support, a mandrel shaft mounted thereon, a conical mandrel on each end of said shaft and axially in line therewith, a die carrier, a conical die on each end thereof adapted to coöperate with the conical mandrels, a die reciprocating cam, a lever adapted to be moved by said cam and connected to the die carrier, a drive shaft, a clutch mechanism interposed between the drive shaft and the die moving cam, means operated from the drive shaft to automatically operate said clutch mechanism, driving means connecting the drive shaft to the mandrel shaft, a clutch mechanism interposed between said driving means and the drive shaft, and means for automatically operating said clutch mechanism.

19. A machine for making conical containers comprising a rigid support, a mandrel shaft mounted thereon, a conical mandrel on each end of said shaft and axially in line therewith, a die carrier, a conical die on each end thereof adapted to coöperate with the conical mandrels, a die reciprocating cam, a lever adapted to be moved by said cam and connected to the die carrier, a drive shaft, a clutch mechanism interposed between the drive shaft and the die moving cam, and means operated from the drive shaft to automatically operate said clutch mechanism to disconnect the die moving cam at the end of each throw of the said lever.

20. In a machine for forming conical containers from pastry blanks, the combination of a conical mandrel, means for rotating the mandrel, a hollow conical die having a longitudinally extending blank-feed throat at one side thereof and a blank support projecting laterally from one edge of said throat, a blank guide adjustable on said support longitudinally of the throat, and means for shifting the die endwise into and out of coöperative relation with the mandrel.

21. In a machine for forming pastry cones, the combination of a pair of oppositely facing conical mandrels, means for rotating the mandrels, a pair of oppositely facing hollow conical dies, and means for reciprocating said dies simultaneously endwise to cause the dies to alternately embrace their associated mandrels.

22. In a machine for making pastry cones, a mandrel shaft, a conical mandrel thereon, a die carrier, a hollow conical die pivoted thereon, means for reciprocating the die carrier to bring the die into and out of coöperative relation with the mandrel, and means for engaging the die as it is moved away from the mandrel to rock said die and thereby discharge the formed container.

23. In a machine for making pastry cones, the combination of a conical mandrel, a hollow conical die having a blank-feed throat at one side thereof, means for rotating the mandrel, and means for imparting a relative longitudinal and tilting movement between the die and mandrel.

24. In a machine for forming conical containers, the combination of a plurality of coöperating conical dies and mandrels, means for rotating the mandrels about their axes, means for moving the dies successively into and out of engagement with the mandrels, and means for automatically rocking the dies during the period of disengagement thereof from the mandrels.

25. In a machine for forming pastry cones, the combination of a conical mandrel, means for rotating the mandrel, a hollow conical die and means for imparting a relative endwise movement between the die and mandrel, said means being adapted to cause the mandrel and die to engage the material being shaped thereby with a yielding pressure.

26. In a machine for forming conical containers from pastry blanks, the combination of a hollow conical die having a blank-feed throat, a conical mandrel, yieldable means carried by the mandrel adapted to coöperate with the die to strip a formed container from the mandrel, means for rotating the mandrel, means for shifting the die endwise into and out of mandrel-embracing position, and means for tilting the die to discharge the shaped container therefrom when the die is moved out of mandrel-embracing position.

This specification signed this twenty-fourth day of November, A. D. 1919.

PAUL ARDUIN.